J. NEWMANN.
DOUBLE ROW BALL BEARING.
APPLICATION FILED JUNE 15, 1917.

1,263,594.   Patented Apr. 23, 1918.

Inventor
John Newmann
By his Attorney

UNITED STATES PATENT OFFICE.

JOHN NEWMANN, OF NEW YORK, N. Y.

DOUBLE-ROW BALL-BEARING.

1,263,594.

Specification of Letters Patent. Patented Apr. 23, 1918.

Application filed June 15, 1917. Serial No. 174,897.

*To all whom it may concern:*

Be it known that I, JOHN NEWMANN, a citizen of the United States, residing in the city of New York, county of Kings, and State of New York, have invented certain new and useful Improvements in Double-Row Ball-Bearings, of which the following is a specification.

The present invention relates to ball bearings having two or more rows or sets of balls.

One object of my invention is to provide a construction which without the necessity of filling openings and without any cages will allow the use of a greater number of balls than in the usual one row ball bearing of equal dimensions and which will at the same time reduce the width of the ball bearing to a great extent.

A further object of my invention is to provide a separator which will not only separate two neighboring balls of one row, but also hold a ball of the adjacent row in staggered or intermediate relation to the balls of the other row.

With these and other objects in view my invention consists in the construction, combination and arrangement of parts as will be hereinafter fully described and set forth in the appended claims.

Figure 1:
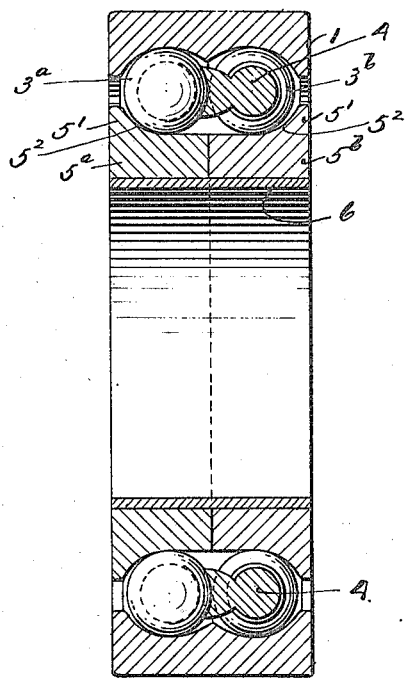
Figures 2, 3:
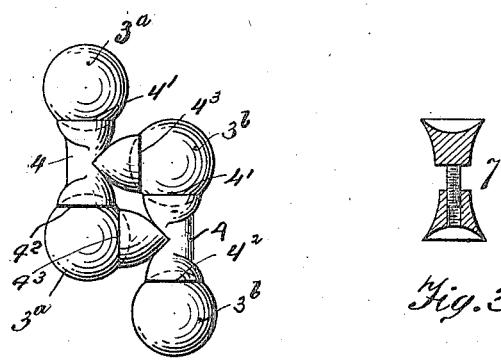

Reference is had to the accompanying drawing which forms part of this specification and in which similar numerals denote corresponding parts in the several figures, Figure 1 being a vertical section of my new bearing; Fig. 2 showing the construction and position of my separators relative to a double row of balls; and Fig. 3 a sectional view of an adjustable end separator.

The double row ball bearing comprises an outer shell or ring and an inner cone composed of two annular sections $5^a$, $5^b$. The outer shell is formed on its inner periphery with annular grooves of circular cross section which are arranged close to one another so that their centers are separated by about the diameter of a ball. The sections $5^a$ and $5^b$ of the inner cone are annular members each formed with an outer annular flange $5^1$ and a race or track $5^2$. These two sections can be joined to each other by means of a bushing 6 after the parts are completely assembled.

The balls $3^a$, $3^b$ are arranged in two rows which are staggered relative to one another and those of each row are separated from one another. The two rows of balls are held in staggered relation by separators 4 of which each consists of a substantially T-shaped member, the branches of which are formed at their ends with bowl-shaped pockets $4^1$, $4^2$ and $4^3$. Two oppositely located bowls as $4^1$ and $4^2$ are adapted to engage parts of two neighboring balls of a row, while the bowl $4^3$ on the laterally projecting branch or arm serves to engage a part of a ball of the adjoining row. For the last separator an adjustable member 7 similar to the one described in my pending application Serial #163115 or of any other suitable construction may be employed. In this manner when all members are completely assembled in the bearing they will be effectively connected and the two rows held in staggered relation to one another. The assemblage of the parts of the ball bearings is effected in the following manner:

First, one row of balls is assembled in one of the races of the outer ring while the sections of the inner ring are removed, by introducing alternately the balls and spacers 4 then locking them together by the adjustable spacer 7. Then the balls of the second row are introduced to rest in the bowls $4^3$ of the members 4, which balls are then locked in position by the last adjustable member 7. Finally the two sections of the inner cone are inserted and joined by the bushing 6.

Since by the employment of my new spacers 4 the two rows of balls will be held in proper alinement relative to one another the provision of separate grooves in the outer ring can be dispensed with, and instead a groove of the shape similar to $5^2$ provided therein.

It will also be clear that my new spacer is not limited to double row bearings but can be equally applied to bearings with three or more rows of balls.

Since the construction may be variously modified without departing from the spirit of my invention, I do not wish to restrict myself to the details described and shown.

What I claim and desire to secure by Letters Patent is:

1. A ball bearing comprising two rings having ball races, sets of balls between said rings and separators of which each is adapted to embrace parts of two neighboring balls of one set and part of a ball of an adjoining set, so that the balls of the latter set are in a staggered relation to those of the other set.

2. A ball bearing comprising two rings having ball races, sets of balls between said rings and separators each formed with pockets at its ends and a lateral pocket to engage parts of two neighboring balls of one set and part of a ball of an adjoining set so that the balls of the latter set are in a staggered relation to those of the other set.

3. A ball bearing consisting of two rings having ball races adjoining one another, the inner ring being composed of two annular halves, two rows of balls between said rings and separators each adapted to engage parts of two neighboring balls in one row and part of a ball in the adjoining row so that the balls in the latter row are in a staggered relation to those of the first row.

4. In a ball bearing having two rows of balls, a T-shaped separator formed at the free end of each arm with bowl shaped pockets.

In testimony whereof, I affix my signature in presence of two witnesses.

JOHN NEWMANN.

Witnesses:
FRED J. GRIESMER,
MAX D. ORDMANN.